United States Patent Office 3,431,113
Patented Mar. 4, 1969

3,431,113
PROCESS OF TREATING CHEESE WHEY
Douglas R. Braatz, Shawano, Wis., assignor to Peebles Foods, Inc., Shawano, Wis., a corporation of Wisconsin
No Drawing. Filed Mar. 19, 1965, Ser. No. 441,314
U.S. Cl. 99—57                                    16 Claims
Int. Cl. A23c 23/00, 21/00, 5/00

ABSTRACT OF THE DISCLOSURE

A process of recovering lactose from a rennet type cheese whey in which the whey is concentrated at a temperature in excess of 49° C. and the lactose crystallized at temperatures above 38° C. under quiescent conditions existing for at least six hours.

---

This invention relates generally to the treatment of cheese whey and more particularly to a prosess for recovering lactose and an improved motor liquor from rennet type cheese whey.

By the term rennet type cheese whey reference is made herein to whey obtained from the manufacture of cheese in which rennet is used as the principal agent to coagulate milk casein. This includes, for example, whey from Cheddar or American cheese, Colby cheese, stirred-curd cheese, washed-curd cheese, Italian cheese, Swiss cheese and other types of cheeses from which the acidity of the whey at time of draining from the vat generally does not exceed approximately 0.16%.

Whey is a principal by-product from the manufacture of cheese and is composed mainly of lactose, whey proteins, inorganic salts and water. Lactos has been the principal material recovered from whey, and while the whey proteins also have commercial value they have been heretofore generally degraded or even destroyed in the processing of the whey to recover the lactose.

The principal industrial practices for the processing of whey involve subjecting the whey to crystallization for the recovery of the lactose after pretreatment of the whey to place it in a form susceptible to lactose crystallization. A principal deterrent in the recovery of crystalline lactose is the presence of the whey proteins or lactoproteins, as sometimes referred to, and this is especially true where the whey is concentrated to optimum solids content for lactose crystallization. The exact reason why untreated whey proteins interfere with the crystallization of the lactose has not been fully established. In conventional practices a portion of the protein of the whey is coagulated by addition of lime or by the application of heat or possibly by incorporation of some coagulant, after which the coagulated protein is removed by centrifuging, decantation, or filtration to provide an effluent which is then concentrated by evaporation to optimum solids content. Thereafter, the lactose is crystallized from the concentrate. The lactos crystals are then removed from the whey leaving a protein containing mother liquor, generally of an inferior grade. The lactose from such conventional processes is usually of a fine grain and will contain some contaminants.

It has been proposed heretofore to crystallize lactose from lacteal materials such as skim milk without previous removal of the protein. In the treatment of the skim milk, approximately 6% of cane sugar is added to the milk, and the mixture condensed to 70% total solids. This may be done without development of undue viscosity, apparently because of the presence of the added cane sugar. The viscosity is such that the lactose readily crystallizes and is then removed by filtering or centrifuging. However, the recovered lactose crystals are contaminated with lactoprotein.

In still another process, the lactoprotein is prevented from interfering with the crystallization of the lactose by first treatment with suitable enzymes. The latter process is expensive and requires carefully controlled conditions.

Another proposed procedure for the manufacture of milk sugar or lactose involves a special heat treatment which is said to impart to the condensed whey properties which are conducive to the production of relatively large and fast separating crystals. The process is described in Peebles et al. United States Patent No. 2,439,612, and involves momentarily heating the whey condensate to temperatures in excess of 100° C. and preferably in the range of 105°–127° C. This procedure is said to irreversibly coagulate substantially all of the lactoprotein which is readily susceptible to coagulation; namely, some 60–62% of the total protein content. Peebles et al. report that through such denaturing there is a substantial shrinkage in the particle size of the protein, which shrinkage is accompanied by a loss of water of hydration, all of which contributes to the low viscosity of the whey concentrate which permits crystallization of the latcose without prior removal of the coagulated protein from the whey condensate. Peebles et al. disclose that the mother liquor recovered from the crystallization step may be dried to provide a material which is useful as an ingredient in stock or poultry feed. Peebles et al, recognize, which is typical of the knowledge of the prior art, that if a whey concentrate is prepared by vacuum evaporation an attempt to crystallize out lactose from the concentrate is unsatisfactory because the lactose crystals lack uniformity as to size and a significant part of the crystals would be so small that they could not be readily separated from the whey serum. Peebles et al. relate that a concentrate produced by conventional vacuum evaporation possesses a relatively high viscosity because of the presence of partially coagulated protein particles which have considerable water of hydration.

It is a principal object of the invention to provide an improved process for the treatment of rennet type cheese whey to recover a relatively pure lactose without prior removal of lactoprotein.

It is another object of the invention to provide a process for the treatment of rennet type cheese whey for the recovery of a high quality mother liquor having a minimum amount of protein degradation.

Another object of the invention is to provide a simplified process employing no added chemicals for the crystallization of lactose from rennet type cheese whey.

It is a further object of the invention to provide a process which makes possible the recovery of lactose from rennet type cheese whey, while at the same time affording a valuable food product in the mother liquor.

It is a still further object to provide a process for the recovery from rennet type whey of a protein-containing mother liquor from which a high grade dried food product may be produced. This food product is excellently suited for human consumption and forms a most desirable base for an infant food.

In practicing the process of the invention, a quantity of rennet type cheese whey, an American Cheddar type cheese whey being preferred, is condensed to a solids content in the range of 42–70% and the condensed whey removed from the condensation step at a temperature, in excess of 49° C., preferably in excess of 54° C. The condensed whey is transferred to suitable containers where the lactose is permitted to crystallize from the condensed whey while the why is maintained at a temperature in excess of 380 C. until at least 75% of the later separated lactose has crystallized. Thereafter, the crystallized lactose is separated from a motor liquor.

Conventional vacuum evaporators or air evaporators may be employed for the concentration of the cheese whey in preparation for the crystallization step. Normally, but not necessarily, the cheese whey is first pasteurized by being passed through heat exchange equipment prior to condensation and here the whey is subjected to a time-temperature treatment preferably not exceeding 74° C. for approximately 30 seconds or an equivalent heat treatment in terms of whey protein denaturation. During condensing the temperature of the cheese whey is desirably maintained below 74° C. to minimize whey protein denaturation. It is possible in the practice of the process to employ higher temperatures but this is done with the danger of excessively degrading the lactoprotein and making the protein less suitable for human consumption.

It has been found that if the whey protein is denatured to a valve within the range of about 40 to 60% of the total protein content, the condensed whey becomes excessively viscous and lactose crystallization is not uniform, making it difficult to separate the lactose from the mother liquor. The viscosity increase in the foregoing range of denaturation is believed to result from hydration and aggregation of the protein molecules as effected by the heat. Temperature treatments that effect less than 40% denaturation of the total protein are not severe enough to adversely affect viscosity and interfere with the subsequent lactose crystallization. Temperature treatments that effect over 60% denaturation appear to irreversibly coagulate the protein and provide a concentrated whey which has a viscosity favorable to lactose crystallization. However, extensive denaturation of the protein is less desirable in that it possibly degrades the food value of the mother liquor. Denaturation is determined herein in accordance with the well-known Harland-Ashworth procedure outlined on pages 477–478, Milk Industry Foundation Laboratory Manual, Third Edition, 1959.

The process of the invention in contrast to the earlier proposed processes for the manufacture of lactose utilizes a relatively high temperature crystallization. The condensed whey is removed from the condensation step at a temperature in excess of 49° C., usually in excess of 55° C., and preferably in the range of 60–71° C. The minimum critical temperature for the removal of the condensed whey from the evaporator is governed by the solids content of the whey concentrate. Generally speaking, the condensed whey is removed from the evaporator at a temperature in excess of:

$$Y = 0.244X + 40.5$$

where Y is the removal temperature in degrees centigrade and X is the numerical value of the percent solids content of the condensed whey. In the conventional operation of a vacuum evaporator, the condensed whey is removed from the evaporator at temperatures less than 49° C. for economic considerations, as compared with the higher temperatures of Y employed in the invention as noted above. The temperature Y in the above formula is the lowest temperature at which condensed whey of a specific solids concentration can be subjected to agitation during or after transfer to the crystallization zone without adversely effecting subsequent crystallization of the lactose. Agitation of the condensed whey at temperatures below Y is thus to be avoided for best results.

The whey concentrate is transferred to a crystallization zone and there permitted to crystallize while the whey is held for a prolonged period at a temperature in excess of 38° C. The whey is held for at least six hours (desirably at least 12 hours) at a temperature in excess of 38° C. In a preferred practice of the process, the condensed whey is held above 49° C. for at least six hours of the crystallization period. Whey concentrate placed in containers of 44 gallons or larger and held at ambient room temperatures will require significantly more than six hours for the condensate temperature to drop below 38° C. Quiescent conditions in the crystallization zone favors the formation of large, easily separable crystals and for this reason agitation is desirably avoided during the crystallization of the lactose, at least during the first six hours (preferably at least 12 hours) of the crystallization at temperatures in excess of 38° C. It has been generally experienced that where the whey concentrate is allowed to cool at a faster rate, small lactose crystals are likely to form which are not uniform in size and which are generally difficult to separate.

The cheese whey is desirably condensed to a solids content in the range of 42–70% with the optimum range being from 58–62%.

Lactose crystallization will commence in the process of the invention without "seeding" which is sometimes required in other processes. The carrying-on of the crystallization at the elevated temperatures and the avoidance of agitation of the whey concentration during crystallization favor the formation of large, relatively pure, lactose crystals which are easy to separate from the mother liquor. It is believed that such conditions are conducive to optimum crystallization for several reasons. First, the lactose in the serum portion of the condensed whey is maintained below its labile area with respect to supersaturation and more near its optimum point for forced crystallization in its metastable area. A supersaturated solution in the labile area will undergo spontaneous crystallization which results in numerous and very small crystals. Small lactose crystals are much more difficult to separate from the mother liquor than larger crystals.

Another factor that is thought to favor optimum crystallization employing the process of the invention is that the higher crysallization temperatures increase the rate of conversion of beta lactose to alpha lactose which is the form of lactose that crystallizes from solution. A solution of lactose contains about 1.6 parts of beta lactose to 1 of alpha lactose. It is characteristic of lactose solutions to maintain this equilibrium. As alpha lactose crystallizes from a saturated solution, some of the beta lactose is converted to alpha lactose to maintain the equilibrium. The conversion of beta lactose to alpha lactose increases as the temperature is increased. Since the crystallization of lactose is dependent upon the concentration of alpha lactose, it is essential for the optimum crystallization rate to maintain conditions which favor the conversion to the alpha form.

The third factor involved in the improved crystallization obtained with the process of the invention is the relatively low viscosity. The higher temperatures of the crystallization step of the invention provide a lower viscosity concentrate than heretofore has been present during lactose crystallization of conventional processes. Higher viscosities decrease the rate and size of crystal formation since such inhibit the migration of soluble lactose and lactose nuclei to the crystal centers. Maintaining the temperature of the whey concentrate at an elevated temperature during crysallization, at least during the early hours, greatly increases the rate and size of crystal formation.

Generally, the rate of cooling of the whey concentrate during the crystallization step is so regulated that the temperature of the concentrate does not drop below 38° C. during the first six hours of crystallization. Normally, containers of 44 gallons or more of the whey concentrate held at ambient room temperature and having initial temperatures in excess of 49°–54° C. will remain well above 38° C., usually above 49° C., during the first six hours of crystallization. After the initial crystallization period which may extend to 20 hours or more above 38° C., the condensed whey is most often held for six hours or more at temperatures below 38° C. The lactose is then centrifuged from the mother liquor. If there is to be prolonged storage of the crystallized condensed whey, it is desirable that it be maintained at a temperature below 10° C.

The centrifuged lactose may be purified by washing, recrystallizing, centrifuging, again washing, and drying in accordance with conventional practice, or it may be dried directly from the centrifuge as an edible lactose for use as a food ingredient.

Heretofore, the protein of the mother liquor has in the prior art processes generally been so severely degraded that it could only be used, if at all, in animal feeds. The protein of the mother liquor recovered in the process of the invention is a high quality material and may be employed in human foods. The mother liquor from the centrifugation may be readily dried in a conventional spray drier to recover an edible, partially delactosed, dried whey. The whey product has a light yellow color and a very slight acidic flavor. The product is readily dispersible in water and other aqueous fluid products.

It has been established that a mother liquor containing up to 50% solids is sufficiently fluid to treat with ion exchange resins to adjust the ash content. Various resins are available for use in the demineralization. A resin mixture that may be employed is made up of equal portions of polystyrene quaternary ammonia anion resin which provides a hydrogen cycle and sulfonated polystyrene cation resin which provides a hydroxyl cycle. The ion exchange resin is incorporated in the mother liquor and held in a vessel for ½ to 1 hour with intermittent agitation. The resins may be separated from the mother liquor by centrifugation. Analyses of typical demineralized products are found in Table I below.

TABLE I.—COMPOSITION ANALYSES

|  | NFDM, percent | Dried whey, percent | Partially delactosed whey product, percent | Demineralized product, percent |
|---|---|---|---|---|
| Moisture | 3.5 | 3.5 | 3.5 | 3.5– 3.5 |
| Fat | 1.0 | 1.0 | 3.0 | 3.4– 3.5 |
| Protein | 36.0 | 12.0 | 22.8 | 24.4–28.8 |
| Lactose | 51.5 | 72.0 | 53.2 | 59.3–63.7 |
| Minerals | 8.0 | 11.5 | 17.5 | 9.4– 0.5 |

The first data containing column of Table I which is headed NFDM is an analysis of a normal non-fat dry milk. An analysis of a typical American Cheddar type cheese dried whey is found in the next column. In the third data containing column of Table I there is presented a typical analysis of the partially delactosed whey produced in accordance with the process of the invention. The latter product is recovered from the mother liquor. The protein, lactose and mineral content of the product will vary depending upon the amount of lactose removed from the product during the processing. In the last column in Table I there is presented a typical analysis range for the demineralized product of the invention which is obtained by subjecting a mother liquor to demineralization with ion exchange resins. The protein, lactose, and mineral content of the demineralized product will vary depending upon the composition of the partially delactosed mother liquor and also the extent of the ion exchange treatment and type of resins used in the ion exchange.

It is possible to selectively remove some of the ash constituents of the mother liquor of the process using suitable ion exchange resins and combining the demineralized product with lactose and skim milk to provide a product closely resembling human milk. The partially delactosed whey of the invention not only may be used in human foods but may be incorporated in high quality animal foods.

The following example provided an illustration of the process of the invention for the treatment of American cheese whey.

Example I

A batch of American Cheddar type cheese whey is pasteurized by passing through a heat exchanger and being heated to a temperature of approximately 74° C. for 30 seconds. Thereafter, the pasteurized whey is condensed in a vacuum evaporator to a solids content of 62% with the whey at no time being heated to a temperature in excess of 74° C. The whey is removed from the evaporator at a temperature of 60° C. and placed in 44 gallon drums. The drums are held in a room having a temperature of 22° C. and at the end of 24 hours have cooled to 37° C. At six hours, the temperature is 49° C. At the end of 28 hours, substantially all of the later separated lactose has crystallized. The barrels are held without agitation. The lactose crystals are separated by centrifuging from a mother liquor which is later dried and found to have a moisture content of 3.5%, a fat content of 3%, a protein content of 22.8%, 53.2% lactose, and 17.% minerals. The centrifuged lactose crystals are purified by washing, recrystalling, centrifuging, washing, and thereafter drying.

Although exemplary embodiments of the invention have been disclosed herein for purposes of illustration, it will be understood that various changes, modifications and substitutions may be incorporated in such embodiments without departing from the spirit of the invention as defined by the claims which follow.

I claim:
1. A process for recovering lactose from a rennet type cheese whey, said process comprising:
providing the rennet type cheese whey in a crystallization zone at a solids concentration in the range of 42–70% and at a temperature in excess of 49° C. and there permitting lactose to crystallize from the whey while holding said whey under substantially quiescent conditions and maintaining the temperature of the whey in excess of 38° C. for at least the first six hours of crystallization; and
separating crystallized lactose from a mother liquor of the whey.

2. A process as defined in claim 1 in which the whey is slowly cooled during said time of at least six hours during which it is held above 38° C., which time constitutes an initial crystallization period, the thus condensed whey being thereafter held at below 38° C. for an additional period of at least six hours before being separated from the mother liquor, said separation being by centrifuging.

3. A process for recovering lactose from a rennet type cheese whey, said process comprising:
providing the rennet type cheese whey at a solids concentration in the range of 42–70% and at a temperature in the range of 55° C.–74° C. in a crystallization zone and there permitting lactose to crystallize from the whey while holding said whey under substantially quiescent conditions and maintaining the temperature of the whey in excess of 49° C. for at least the first six hours of crystallization; and
separating crystallized lactose from a mother liquor of the whey.

4. A process of treating rennet type cheese whey to separate lactose from an improved mother liquor, said process comprising:
condensing a quantity of rennet type cheese whey at a temperature in excess of 49° C. to a solids content in the range of 42–70%;
removing the condensed whey from the condensation step at a temperature in excess of $$Y = 0.244X + 40.5$$

where
Y is the removal temperature in ° C. and
X is the numerical value of the percent solids content of the condensed whey;
permitting lactose of the condensed whey to crystallize while maintaining said whey at a temperature in excess of 38° C. for at least the first six hours of crystallization; and separating crystallized lactose from a mother liquor of the whey.

5. A process as defined in claim 4 including the additional step of spray drying the mother liquor to recover a dried product.

6. A process of treating rennet type cheese whey to separate lactose from an improved mother liquor, said process comprising:

condensing a quantity of rennet type cheese whey at a product temperature in excess of 49° C. but less than 74° C. to a solids content in the range of 42–70%;

removing the condensed whey from the condensation step at a temperature in excess of $$Y = 0.244X + 40.5$$

where
Y is the removal temperature in ° C. and
X is the numerical value of the percent solids content of the condensed whey;

permitting lactose to crystallize from the condensed whey in a crystallization zone and avoiding agitation of said condensed whey at temperatures below the foregoing temperature of $Y = 0.244X + 40.5$ while maintaining said whey at a temperature in excess of 49° C. for at least the first six hours of crystallization; and separating crystallized lactose from a mother liquor.

7. A process of treating American cheese whey to recover lactose therefrom, said process comprising:

condensing a quantity of American cheese whey at a temperature greater than about 49° C. to a solids content in the range of 42–70% and under conditions selected to limit denaturation of the whey protein to outside the range of 40–60%;

removing the condensed whey from the condensation step at a temperature in excess of 54° C.;

transferring the condensed whey to a crystallization zone and there holding the whey under substantially quiescent conditions and ambient cooling to crystallize lactose from a mother liquor, the temperature in said crystallization zone being above 38° C. for a time of at least six hours during the initial cooling; and separating crystallized lactose from the mother liquor.

8. A process of treating American cheese whey to recover lactose therefrom, said process comprising:

condensing a quantity of American cheese whey to a solids content in the range of 42–70% with the condensation being carried on at a maximum product temperature of less than 74° C. and under conditions selected to limit denaturation of the whey protein to outside the range of 40–60%;

removing the condensed whey at a temperature in excess of 54° C. from the condensation step and transferring the whey to a crystallization zone where it is held under substantially quiescent conditions and at a temperature in excess of 49° C. for the first six hours to permit crystallization of lactose from a mother liquor; and separating crystallized lactose from the mother liquor.

9. A process of treating American cheese whey to separate lactose from a mother liquor, said process comprising:

condensing a quantity of American cheese whey at a temperature in excess of 49° C. to a solids content in the range of 42–70%, under conditions selected to minimize denaturation of the whey proteins to less than 40%;

removing the condensed whey from the condensation step at a temperature in excess of $$Y = 0.244X + 40.5$$

where
Y is the removal temperature in ° C. and
X is the numerical value of the percent solids content of the condensed whey;

holding the condensed whey in a substantially quiescent state to permit crystallization of lactose from a mother liquor and maintaining the whey at a temperature of at least 38° C. for the first six hours of the crystallization; and separating crystallized lactose from the mother liquor.

10. A process for recovering a high quality mother liquor from rennet type cheese whey, said process comprising:

condensing a quantity of rennet type cheese whey at a product temperature above 49° C. but below 74° C. to obtain a condensed whey product having a solids content in the range of 42–70% and under conditions selected to limit denaturation of the whey protein to outside the range of 40–60%;

removing the whey from the condensation step at a temperature in excess of $$Y = 0.244X + 40.5$$

where
Y is the removal temperature in ° C. and
X is the numerical value of the percent solids content of the condensed whey;

holding the condensed whey at a temperature above 38° C. for at least six hours in a crystallization zone and there permitting lactose to crystallize from a mother liquor while avoiding agitation of the whey at temperatures below the foregoing temperature of $Y = 0.244X + 40.5$; and separating crystallized lactose from the mother liquor.

11. A process of treating rennet type cheese whey to separate lactose from a mother liquor, said process comprising:

condensing a quantity of rennet type cheese whey at a product temperature of more than 49° C. but less than 74° C. to a solids content in the range of 42–70% under conditions selected to minimize denaturation of the whey protein to less than 40%;

removing the condensed whey from the condensation step at a temperature in excess of $$Y = 0.244X + 40.5$$

where
Y is the removal temperature in ° C. and
X is the numerical value of the percent solids content of the condensed whey;

holding the condensed whey under substantially quiescent conditions for at least 12 hours to permit crystallization of lactose from a mother liquor while maintaining the condensed whey in excess of 49° C. for at least the first six hours; and separating crystallized lactose from the mother liquor.

12. A process of treating rennet type cheese whey to separate lactose from a mother liquor, said process comprising:

condensing a quantity of rennet type cheese whey to a solids content in the range of 42–70% under temperature conditions above 49° C. but under conditions including a maximum product temperature of less than 74° C. to minimize the denaturation of whey protein to less than 40% with the whey being removed from the condensation step at a temperature in excess of $$Y = 0.244X + 40.5$$

where
Y is the removal temperature in ° C. and
X is a numerical value of the percent solids content of the condensed whey;

transferring the condensed whey to a crystallization zone and there crystallizing lactose from a mother liquor while avoiding agitation of the condensed whey at temperatures below the foregoing temperature of $Y = 0.244X + 40.5$, while maintaining the whey in the crystallization zone at a temperature of at least 38° C. for the first six hours; and recovering crystallized lactose from the mother liquor.

13. A process of treating rennet type cheese whey to produce lactose and an improved mother liquor, said process comprising:

condensing a quantity of rennet type cheese whey to a solids content in the range of 42–70% and under conditions selected to limit denaturation of the whey protein to outside the range of 40–60%;

removing the condensed whey at a temperature in excess of 54° C. from the condensation step and transferring the whey to a crystallization zone where it is held under substantially quiescent conditions and at a temperature in excess of 38° C. for the first six hours to permit crystallization of lactose from a mother liquor;

separating crystallized lactose from the mother liquor; and thereafter, subjecting the mother liquor to a demineralization operation.

14. A process of treating rennet type cheese whey to produce lactose and a dried product from a mother liquor of the whey, said process comprising:

condensing a quantity of rennet type cheese whey to a solids content in the range of 42–70% and under conditions selected to limit denaturation of the whey protein to outside the range of 40–60%;

removing the condensed whey from the condensation step at a temperature in excess of 49° C.;

transferring the condensed whey to a crystallization zone and there permitting lactose to crystallize from the condensed whey while maintaining said whey at a temperature in excess of 38° C. until at least 75% of the later separated lactose has crystallized;

separating crystallized lactose from a mother liquor of the whey; and spray drying the mother liquor to recover a dried product.

15. A process of treating rennet type cheese whey to obtain crystallized lactose therefrom comprising:

condensing a quantity of rennet type cheese whey to a solids content in the range of 42–70% at a maximum product temperature of less than 74° C. with the whey being removed from the condensation step at a temperature in excess of 49° C. and under conditions selected to limit denaturation of the whey protein to outside the range of 40–60%;

transferring the condensed whey to a crystallization zone and there holding the whey at a temperature above 38° C. under substantially quiescent conditions and ambient cooling for at least six hours to crystallize lactose from a mother liquor; and separating crystallized lactose from the mother liquor.

16. A process of treating rennet type cheese whey to separate lactose from a mother liquor, said process comprising:

condensing a quantity of rennet type cheese whey at a maximum product temperature in the range of 60°–74° C. to a solids content in the range of 42–70% and under conditions selected to limit denaturation of the whey protein to outside the range of 40–60%;

removing the condensed whey at a temperature in excess of 54° C. from the condensation step and transferring the whey to a crystallization zone where it is held under substantially quiescent conditions at a temperature above 38° C. for a period of at least six hours to permit crystallization of lactose from a mother liquor; and separating crystallized lactose from the mother liquor.

References Cited

UNITED STATES PATENTS 2,768,912   10/1956   Peebles et al. _____ 127—31

RAYMOND N. JONES, *Primary Examiner.*

STEVEN E. HEYMAN, *Assistant Examiner.*

U.S. Cl. X.R.

127—31, 58